(12) United States Patent
Miller

(10) Patent No.: US 6,799,238 B2
(45) Date of Patent: Sep. 28, 2004

(54) BUS SPEED CONTROLLER USING SWITCHES

(75) Inventor: Steven C. Miller, Livermore, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 234 days.

(21) Appl. No.: 10/068,991

(22) Filed: Feb. 7, 2002

(65) Prior Publication Data

US 2003/0149805 A1 Aug. 7, 2003

(51) Int. Cl.[7] .............................................. G06F 13/00
(52) U.S. Cl. ......................... 710/302; 710/306; 710/2
(58) Field of Search .......................... 710/56, 60, 302, 710/304, 305, 307, 309, 311, 312, 313, 314, 316, 2–4, 8–12, 72–74, 105–107; 713/400

(56) References Cited

U.S. PATENT DOCUMENTS

| | | | | |
|---|---|---|---|---|
| 5,838,995 A | * | 11/1998 | Chen et al. ................... | 710/60 |
| 6,081,863 A | * | 6/2000 | Kelley et al. ................ | 710/312 |
| 6,134,621 A | * | 10/2000 | Kelley et al. ................ | 710/311 |
| 6,182,178 B1 | * | 1/2001 | Kelley et al. ................ | 710/314 |
| 6,195,723 B1 | * | 2/2001 | Neal et al. ................... | 710/313 |
| 6,237,057 B1 | * | 5/2001 | Neal et al. ................... | 710/309 |
| 6,295,568 B1 | * | 9/2001 | Kelley et al. ............... | 710/305 |
| 6,311,247 B1 | * | 10/2001 | Spencer ...................... | 710/307 |
| 6,338,107 B1 | * | 1/2002 | Neal et al. ................... | 710/302 |
| 6,425,024 B1 | * | 7/2002 | Kelley et al. ................. | 710/56 |
| 6,519,669 B1 | * | 2/2003 | Yanagisawa ................ | 710/304 |

* cited by examiner

Primary Examiner—Christopher B. Shin
(74) Attorney, Agent, or Firm—Schwegman, Lundberg, Woessner & Kluth, P.A.

(57) ABSTRACT

Switches are used to serially isolate connectors for peripheral devices on a bus. Bus speed is selected based on the number of peripheral devices coupled to the bus via the connectors. Switches are used in the bus to provide selected isolation of the connectors. In one embodiment, the bus is able to operate at higher speeds when fewer connectors are on the bus. A method of configuring the bus determines how many devices are coupled to connectors on the bus. Portions of the bus not having devices coupled to connectors are isolated by controlling the switches between on and off states.

20 Claims, 2 Drawing Sheets

BUS SPEED CONTROLLER USING SWITCHES

FIELD OF THE INVENTION

The present invention relates to computer busses, and in particular to a bus speed controller utilizing switches.

BACKGROUND OF THE INVENTION

A PCI bus in personal computer has a number of slots for plugging in PCI compatible cards. The speed of the bus depends on the number of slots. For the next version of the PCI bus, referred to as PCI-X, the bus speed is also based on the number of physical slots. The PCI-X bus may operate in a PCI-X bus mode or a PCI bus mode. The PCI bus mode supports older PCI cards, and is not generally as fast as PCI-X bus mode, which supports PCI-X bus cards operable at faster rates. Operating a PCI-X bus in PCI mode allowed up to four slots, each operating at 33 MHz, or two slots at 66 MHz. In PCI-X mode, four slots at 66 MHz, two at 100 MHz, or one slot operating at 133 MHz is allowed. In either mode, the maximum speed for the bus is defined by the number of slots provided and the ability of all cards to operate at that speed. Since the PCI bus only operated at a maximum of 66 MHz, PCI cards are generally only capable of operating at 33 MHz or 66 MHz. PCI-X cards are operable at both PCI card speeds, plus 100 MHz or 133 MHz. This allows PCI-X cards to operate on a PCI bus.

Basing bus speed on the number of slots provided allows little flexibility when operating the computer. A user may decide that they desire to use only one of the slots, yet if four slots are provided, they may be limited to operating that slot at only 33 or 66 MHz, even though the card is PCI-X compatible, and capable of running at 133 MHz. Similarly, a computer configured with only a single slot limits a user to using only a single slot. It is difficult to provide flexibility given the current fixed data bus rates available.

SUMMARY OF THE INVENTION

Switches are used to serially isolate connectors for peripheral devices on a bus. Bus speed is selected based on the number of peripheral devices coupled to the bus via the connectors. Switches are used in the bus to provide selected isolation of the connectors. In one embodiment, the bus is able to operate at higher speeds when fewer connectors are on the bus.

A method of configuring the bus determines how many devices are coupled to connectors on the bus. Portions of the bus not having devices coupled to connectors are isolated by controlling the switches between on and off states. Isolating connectors in this manner enables variation in the speed at which the bus operates. Generally, with fewer visible connectors, the bus is allowed to run at a faster speed. The speed is generally limited in one embodiment by the lowest maximum speed of each of the devices coupled to the bus via the connectors.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
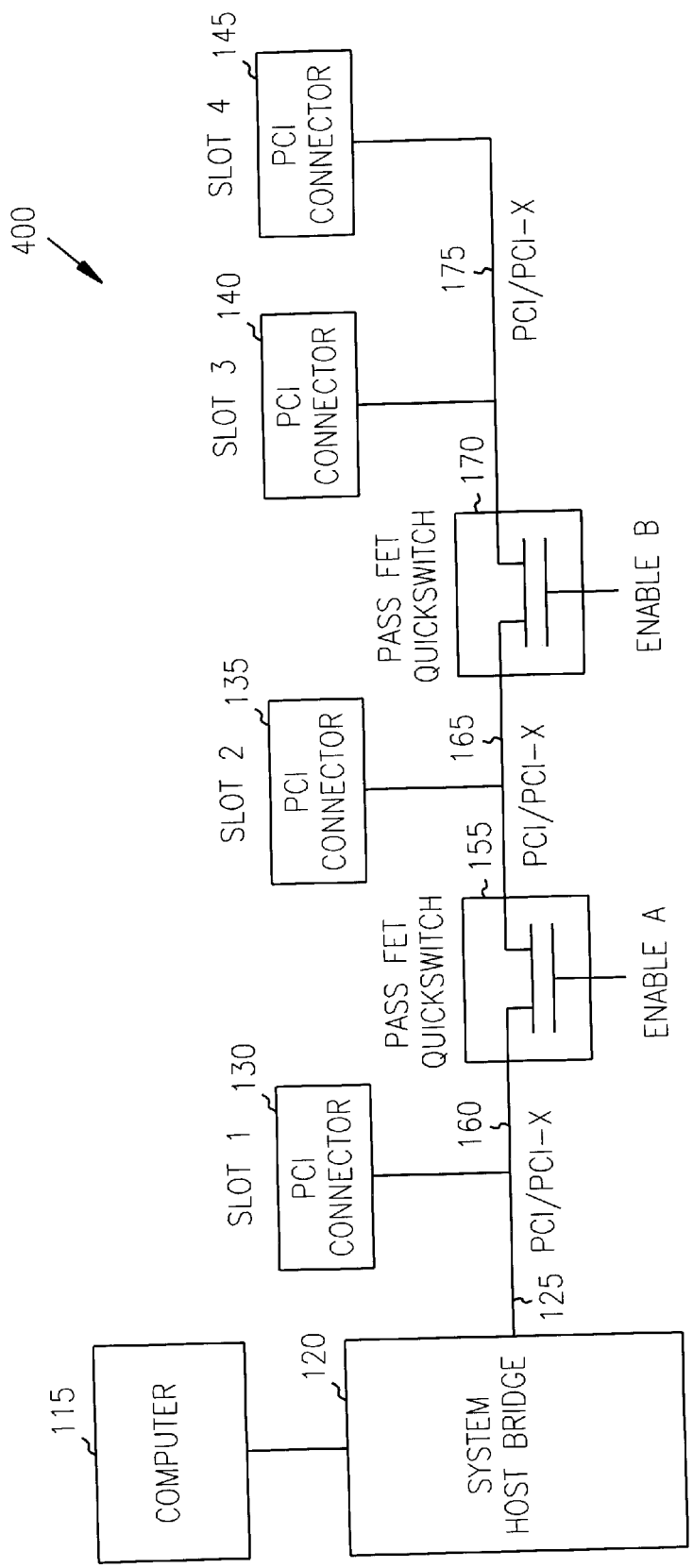
FIG. 1 is a block diagram of a bus having switches between selected slots on the bus.

A system incorporating the present invention is shown generally at 110 in FIG. 1. In one embodiment, the system comprises a computer 115 having, or coupled to a host bridge 120, or bus controller. The computer is a personal computer having a processor, memory and peripheral devices in one embodiment, but may be any other type of computer system or controller utilizing a bus. The system host bridge 120 is coupled to a bus 125, such as a PCI or PCI-X bus. Such busses are well known and described by standards. Four slots, 130, 135, 140 and 145 are serially coupled to the bus 125. In one embodiment, the slots are referred to as PCI connectors.

A first switch 155 is coupled between a first portion 160 of bus 125, and a second portion 165 of bus 125. Slot 130 is the first slot, and is coupled to the first portion 160. First switch 155 is a fast switch, such as a pass FET having the ability to switch between pass and no-pass states very quickly. Switch 155 is shown as a single FET in FIG. 1. It represents a switch for each physical line of the bus, which is a parallel bus. In the pass state, little if any resistance is seen between the first portion 160 and the second portion 165 of bus 125. In the no-pass state, effectively infinite resistance/impedance is seen between such portions of bus 125. In the no-pass state, bus 125 appears to have only one slot, slot 130.

Second portion 165 of bus 125 is coupled via a second switch 170 to a third portion 175 of bus 125. Two slots, 140 and 145 are coupled to the second portion in one embodiment. When second switch 170 is in a no-pass state, while first switch 155 is in a pass state, the bus appears to the bridge 120 as having two slots, 130 and 135. When both switches are in a pass state, the bus appears to have four slots. Thus, the buss is easily configurable for one, two or four slots. The switches are independently accessible by the system in one embodiment.

Each time a card is plugged into a slot, the system 110, either via the computer 115 or bridge 120, detects the card type and speed, and corresponding slot. If only one card is plugged in, it should be plugged into slot 130. The bus speed is set to the highest speed compatible with the card, and the first and second switches are set to an off, or no-pass state. If the card can support a bus speed of 133 MHz, the bus speed is so set. If it can only support 66 MHz, the bus speed is set to 66 MHz.

If a second card is plugged into the next slot, slot 135, it is detected by use of a pin separate from the bus. Each PCI/PCI-X card connector defines 4 pins which are not part of the bus, but are unique to each slot. These pins are M66EN, PCIXCAP, PRSNT1, and PRSNT2. The PRSNT1 and PRSNT2 pins are used to determine if a board is present and to determine it's power consumption. For this purpose it's good enough to know if a board is present. The PCIX-CAP pin determines 3 values of state, if the card is PCI-X protocol capable and also if it can run in PCI-X at 133 or 66. The M66EN pin is used during PCI protocol mode to indicate if the card is 66 MHz capable.

The slot, speed and card type are determined, and the first switch 155 is turned on. The bus speed at this point is set to the highest speed supported by the bus when two cards are attached. If one or more of the cards cannot support such a high speed, the bus speed is set to the highest rate supported by all cards.

If yet a further card is plugged into one of the next slots, it is detected, and the second switch is turned on, exposing slots 140 and 145. In a further embodiment, a third switch is provided on the bus between slots 140 and 145. However, in the current embodiment, such a switch is not required since the maximum bus speed is the same for three or four slots.

Figure 2:
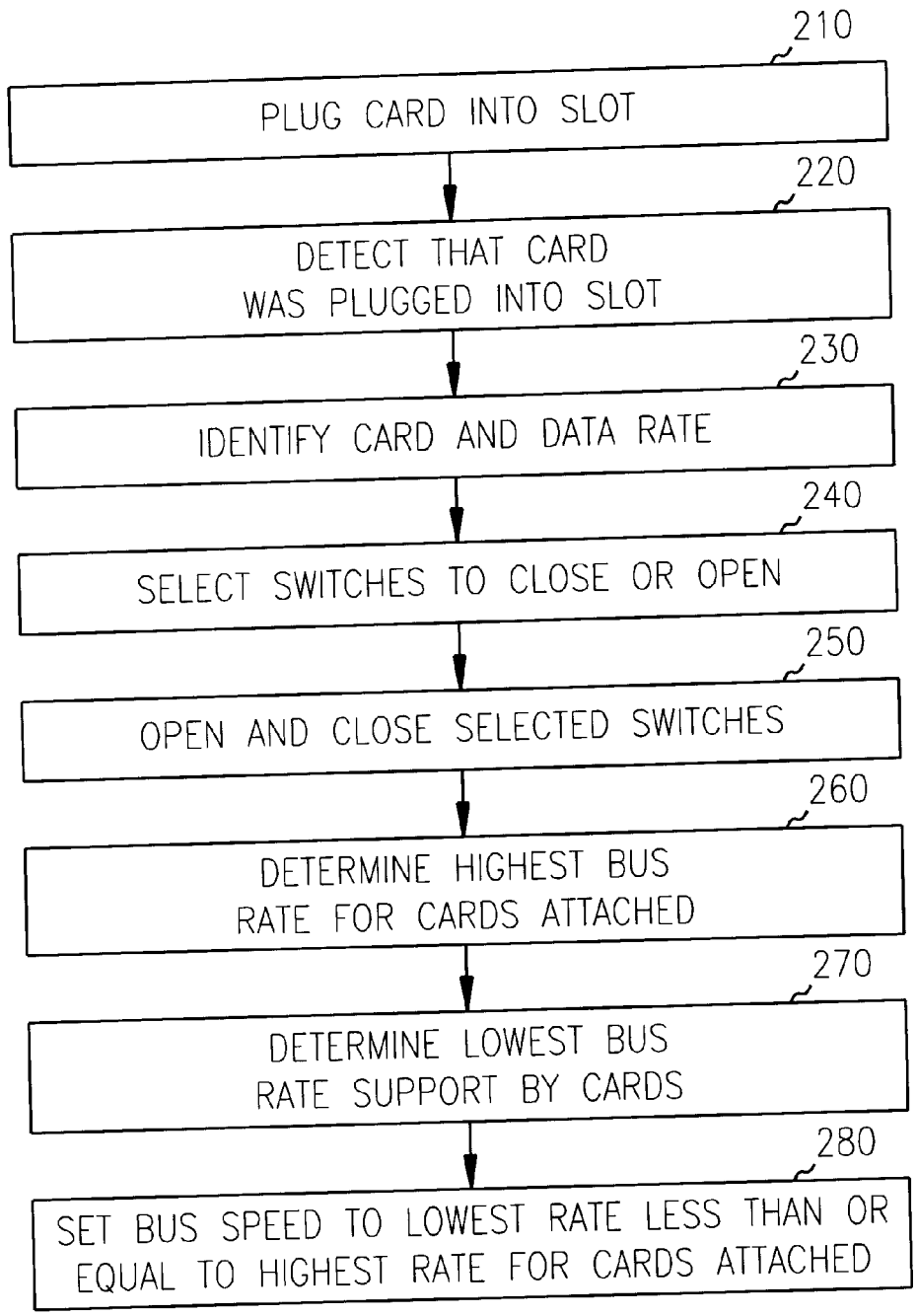
FIG. 2 is a flowchart showing detection of cards, switch control and speed control for the bus of FIG. 1.

FIG. 2 shows a flowchart of a computer program for modifying the bus rate based on cards plugged into slots on the bus. The computer program is stored on a computer readable medium, such as main memory, secondary storage devices such as magnetic or magneto optical disks, or carrier waves associated with computer 115. The program is executed on a processor in computer 115, or bridge/ controller 120. The computer program is written in one or modules as desired, each module implementing one or more functions. It is written in an object oriented language using objects in a further embodiment.

At 210, a card is plugged into slot. In one embodiment, cards are plugged into slots consecutively from the bus controller or bridge 120. The card is plugged into a slot by a user or assembler of the system. At 220, the system detects that a card has been plugged in. The card is identified at 230. A maximum data rate for the card is detected at the same time in accordance with a protocol defined by a bus standard, such as the PCI or PCI-X standard. If other cards are plugged into the bus, their maximum rate is also determined at this time, or at a later time if plugged in later.

At 240, the state of the switches is determined and they are controlled at 250 to either an on or off position such that only slots, or groups of slots having cards attached are visible on the bus. In this manner, the bus is configured for one, two or four cards in one embodiment.

At 260, the highest bus rate available for the number of attached cards is determined. For a PCI-X bus, this rate is 133 MHz for a single card, 100 MHz for two cards, or 66 MHz for three or more cards. At 270, the highest rate supported by all cards is determined. The lower of this rate, and the rate for the bus having corresponding number of cards attached is set at 280. The lower rate is selected to ensure that all attached cards can communicate at the rate of the bus.

In each case, the bus is actually configured via the switches for the different numbers of slots and corresponding card capabilities. Once configured, the bus is treated by the system as a bus having such numbers of slots.

CONCLUSION

A system for controlling a bus speed and configuring the physical make up of the number of connectors available on the bus has been described. Several variations on the embodiments described are contemplated. While a PCI type of bus has been used as an example, other types of busses are used in further embodiments. Multiple connectors/slots may be used in each bus portion as desired such that each switch results in the addition of multiple connectors. The connectors may be used to connect many different types of peripheral devices compatible with the protocol implemented by the bus. The host bridge in one embodiment is a controller, that both utilizes standard protocols to determine card type and speed, as well as containing the logic required to determine how fast to run the bus. The controller further controls the switches to configure the bus consistently with the devices attached. In further embodiments, the computer or personal computer performs such control functions.

What is claimed is:

1. A bus comprising
   a first bus portion having a slot for a card coupled thereto
   a second bus portion having a slot for a card coupled thereto,
   a switch coupled between the first and second bus portion, and
   a controller coupled to the first bus portion, wherein the controller determines a bus speed and switch position based on the capabilities of the bus portions electrically connected to the first bus portion and of cards coupled to the slots of the first bus portion and of the bus portions electrically connected to the first bus portion.

2. The bus of claim 1 and further comprising a third bus portion having two card slots coupled thereto with a switch coupled between the second bus portion and the third bus portion.

3. The bus of claim 1 wherein the switch is a fast transistor.

4. The bus of claim 1 wherein the bus comprises a PCI-X bus wherein the slots are PCI connectors.

5. A computer system having a bus for connecting a variable number of peripheral devices to a bridge, the computer system comprising
   a controller
   a first portion of a bus coupled to the controller and having a connector for a peripheral device
   a second portion of the bus having a connector for a peripheral device
   a first switch coupled between the first and second portions of the bus, wherein the switch selectively connects the first portion of the bus to the second portion of the bus in order to control the number of connectors visible to the bridge.

6. The computer system of claim 5 and further comprising
   a third portion of the bus having a connector for a peripheral device and
   a second switch coupled between the second and third portions of the bus, wherein the second switch selectively connects the second portion of the bus to the third portion of the bus in order to control when the connector on the third portion of the bus is visible to the bridge.

7. The computer system of claim 6 wherein the third portion of the bus comprises a further connector.

8. The computer system of claim 5 wherein the first portion of the bus has multiple connectors.

9. The computer system of claim 5 wherein the bus is a PCI-X bus, and the connectors are PCI connectors.

10. The computer system of claim 5 wherein the bus is capable of operating at a higher speed with only one device attached to a connector having a similar operating speed.

11. The computer system of claim 10 wherein the bus speed is set slower with multiple devices coupled to the bus via connectors.

12. A computer implemented method of determining an operating speed of a bus, the method comprising
    determining maximum operating speeds of one or more devices coupled to the bus
    setting a switch based on the number of devices coupled to the bus; and setting a maximum operating speed of the bus as a function of the switch setting and of maximum operating speeds of the one or more devices coupled to the bus.

13. The method of claim 12 and further comprising setting multiple switches.

14. The method of claim 12 and further comprising setting the operating speed of the bus.

15. The method of claim 14 wherein the operating speed is set to the lesser of the maximum speed of the bus given the number of devices attached, and the lowest maximum speed of the devices.

16. The method of claim 12 wherein the bus is a PCI-X bus having PCI connectors.

17. A method of determining an operating speed of a bus, the method comprising
   determining maximum operating speeds of one or more devices coupled to the bus
   determining the maximum operation speed of the bus given the number of devices coupled to the bus
   setting switches between portions of the bus based on the number of devices coupled to the bus and
   setting a bus speed based on the lesser of the lowest maximum operating speed of all devices, and the maximum operating speed of the bus given the number of devices coupled to the bus.

18. The method of claim 17 wherein the bus is a PCI-X bus having PCI connectors.

19. A system that determines an operating speed of a bus, the method comprising
   means for determining maximum operating speeds of one or more devices coupled to the bus
   means for determining the maximum operation speed of the bus given the number of devices coupled to the bus and
   means for setting a switch based on the number of devices coupled to the bus.

20. A system that determines an operating speed of a bus, the method comprising
   means for determining maximum operating speeds of one or more devices coupled to the bus
   means for determining the maximum operation speed of the bus given the number of devices coupled to the bus
   means for setting switches between portions of the bus based on the number of devices coupled to the bus and
   means for setting a bus speed based on the lesser of the maximum operating speed of all devices, and the maximum operating speed of the bus given the number of devices coupled to the bus.

* * * * *